United States Patent
Oya et al.

(10) Patent No.: US 12,304,413 B2
(45) Date of Patent: May 20, 2025

(54) DOOR OPENING/CLOSING DETERMINATION DEVICE AND DOOR OPENING/CLOSING DETERMINATION METHOD

(71) Applicant: TOYOTA JIDOSHA KABUSHIKI KAISHA, Toyota (JP)

(72) Inventors: Kentaro Oya, Toyota (JP); Takahiro Izuno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 391 days.

(21) Appl. No.: 18/077,806

(22) Filed: Dec. 8, 2022

(65) Prior Publication Data

US 2023/0182671 A1 Jun. 15, 2023

(30) Foreign Application Priority Data

Dec. 13, 2021 (JP) ................................ 2021-201457

(51) Int. Cl.
*G06K 9/00* (2022.01)
*B60R 21/015* (2006.01)
*E05F 15/43* (2015.01)

(52) U.S. Cl.
CPC ........ *B60R 21/01538* (2014.10); *E05F 15/43* (2015.01); *B60R 2300/8006* (2013.01); *E05F 2015/434* (2015.01); *E05Y 2900/506* (2013.01)

(58) Field of Classification Search
CPC ....... B60R 21/01538; B60R 2300/8006; E05F 15/43; E05F 2015/434; E05Y 2900/506
See application file for complete search history.

(56) References Cited

U.S. PATENT DOCUMENTS

| 2007/0176402 | A1  | 8/2007 | Irie et al. |
| 2012/0086793 | A1* | 4/2012 | Anabuki ................ H04N 7/144 |
|              |     |        | 348/E7.085 |
| 2018/0235518 | A1* | 8/2018 | Barton ................. A61B 5/0024 |
| 2020/0284082 | A1* | 9/2020 | Watanabe ................ B61B 1/02 |
| 2022/0144200 | A1* | 5/2022 | Taoka ............... B60R 21/01552 |
| 2022/0194387 | A1  | 6/2022 | Oya |

FOREIGN PATENT DOCUMENTS

| JP | H05-340160 A | 12/1993 |
| JP | H07-137537 A | 5/1995 |
| JP | 2007-198929 A | 8/2007 |
| JP | 2018-011941 A | 1/2018 |
| JP | 2021018578 A * | 2/2021 |

\* cited by examiner

*Primary Examiner* — Avinash Yentrapati
(74) *Attorney, Agent, or Firm* — Dinsmore & Shohl LLP

(57) ABSTRACT

A vehicle doorway camera includes vehicle doors and a vicinity of the doors in a cabin within an imaging range. A vehicle interior monitoring ECU is provided with a gravity center calculating section and a determining section. The gravity center calculating section calculates an occupant's gravity center position included in a captured image. The determining section determines whether or not the gravity center position is included in a keep out area provided in the vicinity of the doors. A loudspeaker issues an alarm inside the cabin when it is determined by the determining section that the gravity center position is included in the keep out area.

6 Claims, 11 Drawing Sheets

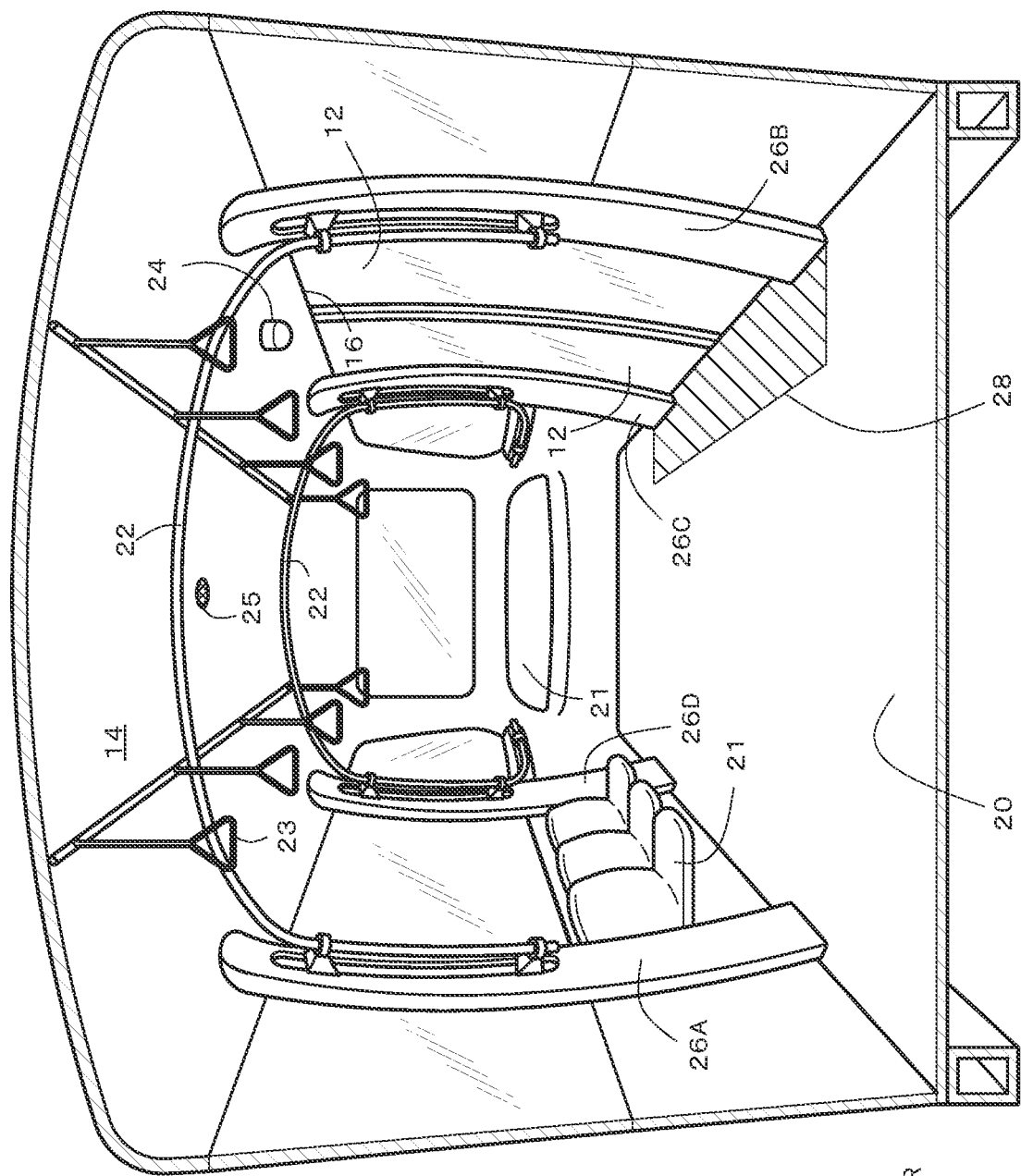
FIG. 3
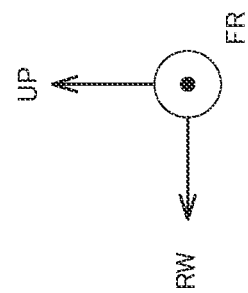

DOOR OPENING/CLOSING DETERMINATION DEVICE AND DOOR OPENING/CLOSING DETERMINATION METHOD

CROSS REFERENCE TO RELATED APPLICATION

This application claims priority to Japanese Patent Application No. 2021-201457 filed on Dec. 13, 2021, which is incorporated herein by reference in its entirety including the specification, claims, drawings, and abstract.

TECHNICAL FIELD

This specification discloses a device and method for determining approval/disapproval of opening/closing vehicle doors.

BACKGROUND

For performing smooth operation of a vehicle, the vehicle is provided with various types of sensors and equipment. For example, JP 2021-18578A provides an omnibus-type vehicle with a camera for imaging a door area in the vehicle. According to an image captured by the camera, a determination is made as to whether an object is present in the door area. When it is determined that an object is present in the door area, an alarm (such as a message) urging movement of the object is issued. The door can be opened or closed when it is determined that no object is present in the door area.

According to JP 2007-198929A, an occupant in the cabin is imaged, the image of the occupant's seated posture is recognized, and deployment of an air bag is controlled according to the recognized result.

If an object is present near the door, the door opening/closing is prohibited, in order to prevent the object from being caught by the door when the opened door is closed and to prevent the object from being drawn into the door pocket and drawn outside the vehicle when the closed door is opened. Even when an occupant is present in a keep out area near the door, there may be a situation where the occupant is not caught by the door, drawn into the door pocket, or drawn outside the vehicle as described above depending on the occupant's posture or situation. On the other hand, even if no occupant is present in the keep out area near the door, there may be a situation where the occupant is caught by the door, drawn into the door pocket, or drawn outside the vehicle as described above depending on the occupant's posture or situation.

Accordingly, this specification discloses a door opening/closing determination device and a method thereof capable of issuing an alarm in relation to the door opening/closing, more appropriately than in the prior art.

SUMMARY

The door opening/closing determination device disclosed in the present specification is provided with imaging equipment and an analyzer. The imaging equipment has an imaging range in which vehicle doors and a vicinity of the doors in the cabin are included. The analyzer analyzes a captured image taken by the imaging equipment. The analyzer is provided with a gravity center calculating section and a determining section. The gravity center calculating section calculates an occupant's gravity center position included in the captured image. The determining section determines whether the gravity center position is included in a keep out area provided in the vicinity of the doors. The door opening/closing determination device is also provided with an alarm device. The alarm device issues an alarm inside the cabin when it is determined by the determining section that the gravity center position is included in the keep out area.

According to the above configuration, the occurrence or non-occurrence of alarm issuance is determined on the basis of the occupant's gravity center position. Therefore, even when any part of the occupant body is included in the keep out area, alarm issuance is avoided so long as the gravity center position is outside of the keep out area. Meanwhile, even when the occupant is outside the keep out area, an alarm is issued if the occupant's gravity center position is inside the keep out area; for example, if the occupant has an instable posture leaned toward the vehicle doorway.

The analyzer in the above configuration may be provided with a posture estimation section. The posture estimation section estimates a posture in order to estimate relative positions of respective parts of an occupant included in the captured image. In this case, the gravity center calculating section determines a gravity center position on an image plane on the basis of the total sum of values which are obtained by multiplying a distance ranging from an original point to each of each of the parts on the image plane of the captured image by a weight ratio of each of the parts.

According to the above configuration, the occupant's gravity center position can be determined accurately.

In the above configuration, the original point can be provided visually on the floor surface in the cabin. Moreover, a view field and magnification of the imaging equipment may be fixed.

According to the above configuration, the view field and magnification of the imaging equipment are fixed, so that when the original point position can be recognized once, since then it becomes possible to grasp the original point position even if the original point is hindered by an occupant, baggage, or the like in the captured image.

In addition, the imaging equipment in the above configuration may be mounted above the vehicle doorway where the doors are provided.

If the doors and the occupant are arranged on the same side when viewed from the imaging equipment, they are overlapped in the captured image, and the center of gravity of the occupant on the basis of the captured image is apt to be included in the keep out area. When the imaging equipment is provided above the vehicle doorway; namely, immediately above the doors, there is avoided arrangement of the doors and the occupant on the same side when viewed from the imaging equipment.

In the above configuration, the posture estimation section may be able to acquire the occupant's height information included in the captured image. In this case, the gravity center calculating section increases the weight ratio of an occupant head part when the occupant's height is low.

As the occupant's height is low, the ratio of the head part to the body becomes high, and the gravity center is set at a high position accordingly. The gravity center of the occupant can be calculated more accurately by compensating the occupant's height to increase the weight ratio of the occupant's head part when the occupant's height is low.

A door opening/closing determination method disclosed in the present specification includes an imaging step and an analysis step. In the imaging step, the vehicle doors and the vicinity of the doors in the cabin are captured by the imaging equipment. In the analysis step, the captured image taken by the imaging equipment is analyzed. The analysis step includes a gravity center calculation step and a determination step. The gravity center calculation step calculates an occupant's gravity center position included in the captured image. It is determined in the determination step whether the gravity center position is included in the keep out area which is provided in the vicinity of the doors. The door opening/closing determination method also includes a warning step. In the warning step, an alarm is issued in the cabin when it is determined in the determination step that the gravity center position is included in the keep out area.

In the above configuration, the analysis step may include a posture estimation step that performs posture estimation to estimate relative positions of respective body parts of the occupant included in the captured image. In this case, the gravity center calculation step determines the gravity center position on the image plane on the basis of the total sum of values obtained by multiplying a distance ranging from an original point to each of the parts on an image plane of the captured image by a weight ratio of each of the parts.

In the above configuration, the original point may be visually provided on the floor surface in the cabin. The view field and magnification of the imaging equipment may be fixed.

In the above configuration, the imaging equipment may be mounted above the vehicle doorway where the doors are provided.

In the above configuration, the posture estimation step may be capable of acquiring the occupant's height information included in the captured image. In this case, in the gravity center calculation step, the weight ratio of the occupant's head part is increased with the height is low.

According to the door opening/closing determination device and method disclosed in the present specification, an alarm about the door opening/closing can be issued more appropriately than in the prior art.

BRIEF DESCRIPTION OF DRAWINGS

Embodiments of the present disclosure will be described based on the following figures, wherein:

FIG. 3 is a view showing, for example, a cabin interior;

DESCRIPTION OF EMBODIMENTS

<Vehicle Configuration>

Figure 1:
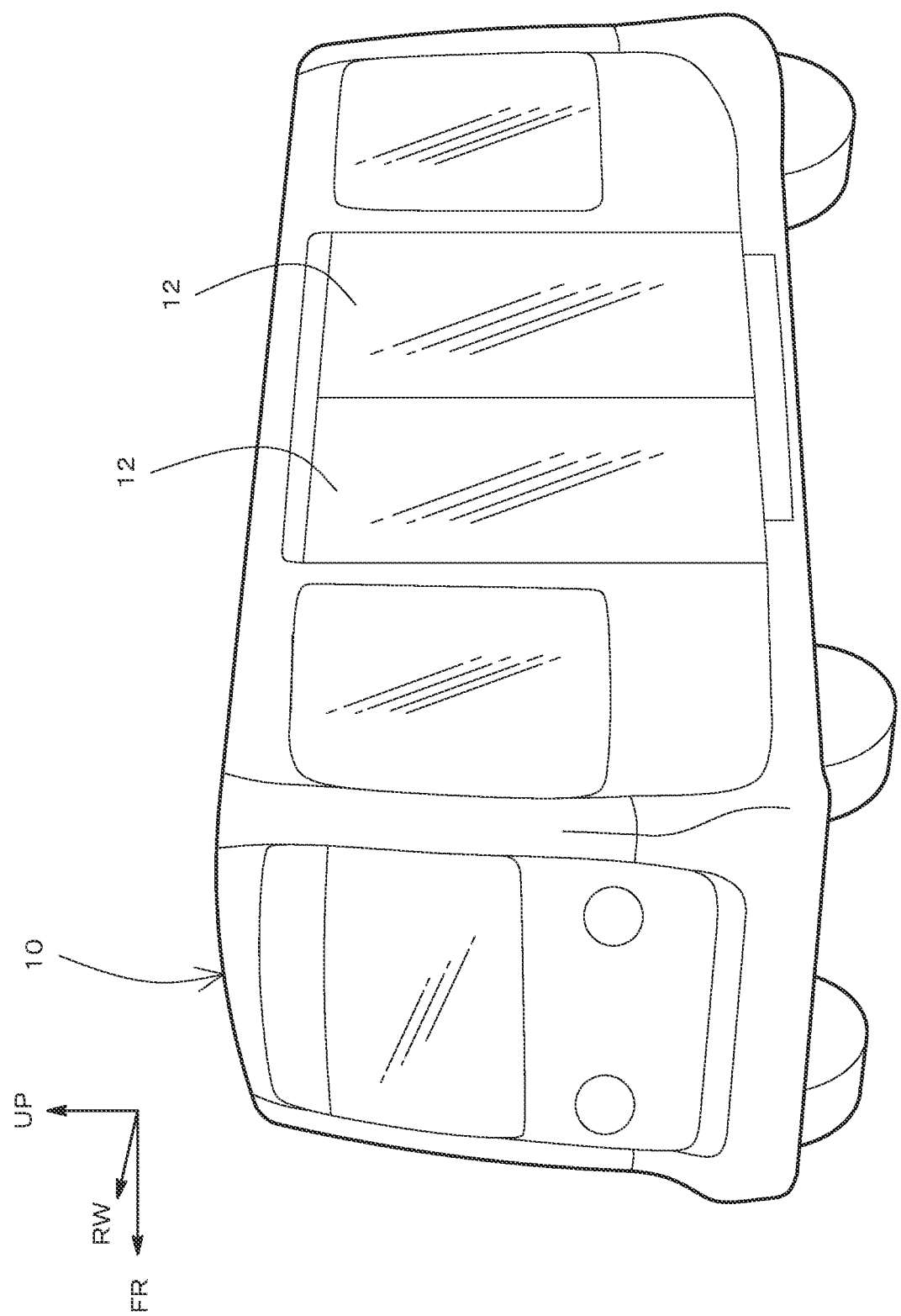
FIG. 1 is a perspective view showing, for example, a vehicle provided with a door opening/closing determination device according a present embodiment.

FIG. 1 shows a vehicle 10 provided with a door opening/closing determination device according to the present embodiment. As described later and as exemplified in FIG. 7, the door opening/closing determination device according to the present embodiment is configured by including an vehicle doorway camera 24 (imaging equipment), a loudspeaker 25 (alarm device), a vehicle interior monitoring ECU 40 (analyzer), and a door opening/closing motor 49.

Figure 2:
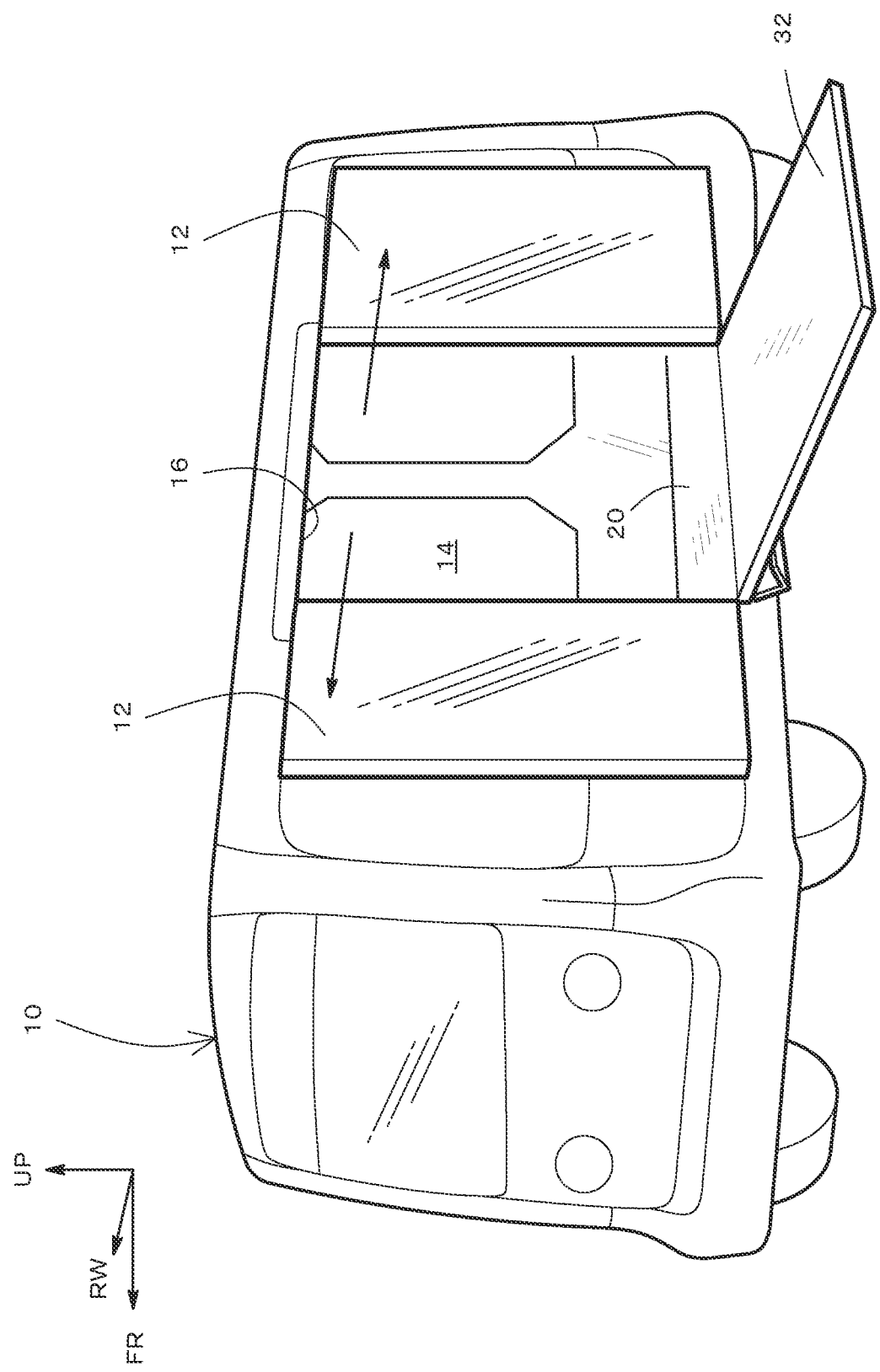
FIG. 2 is a perspective view showing, for example, a state that the vehicle doors are opened.

In FIG. 1 through FIG. 3, the vehicle longitudinal direction is shown by an axis indicated by code FR, the vehicle width direction is shown by an axis indicated by code RW, and a vertical direction is shown by an axis indicated by code UP. The vehicle longitudinal direction FR defines the vehicle front side as a positive direction. The width direction axis RW has its right direction as a positive direction. The height axis UP has its upward direction as a positive direction. These three axes are mutually arranged perpendicularly.

The vehicle 10 exemplified in FIG. 1 is, for example, a so-called minibus having a capacity of about 20 occupants and is used as a shared vehicle. For example, the vehicle 10 travels along a prescribed route and stops at stops provided along the route.

The vehicle 10 may be an electric vehicle (BEV or Battery Electric Vehicle) having a rotary electric machine (not shown) as a drive source. The vehicle 10 may also have an internal combustion engine as the drive source. The vehicle 10 is also switchable between manual drive and autonomous drive.

A side surface of the vehicle 10, namely a surface (UP-FR surface) perpendicular to the RW axis, is provided with double sliding doors 12, 12. The doors 12, 12 are, for example, hanging type outside sliding doors, and an unshown rail mechanism is provided above the doors 12, 12. By adopting the hanging type for the doors 12, 12, interference with a slope board 32 (see FIG. 2) provided below the doors 12, 12 is avoided.

As exemplified in FIG. 2, the doors 12, 12 are overhanged outward in the vehicle width direction and moved in the vehicle longitudinal direction. Accordingly, a vehicle doorway 16 is opened when the doors 12, 12 are moved from the closed position to the open position.

FIG. 3 shows an example of a layout within a cabin 14. The cabin 14 is roughly divided into a driver seat area (not shown) and an occupant area. FIG. 3 illustrates the occupant area. The occupant area is provided with a plurality of seats 21. The seats 21 are provided at positions away from the doors 12, 12. For example, the seats 21 are provided on the side opposite to the side where the doors 12, 12 are provided and at a rear end in the cabin 14.

In the occupant area, an area not provided with the seats 21 is a standing-riding area. In the occupant area, the area where no seat 21 is provided is a standing-riding area. In the standing riding area, the side wall and ceiling wall of the cabin 14 are provided with handrails 22, and the ceiling wall of the cabin 14 is provided with hanging straps 23. For example, the handrail 22 is fixed to side pillars 26B, 26C provided at respective sides of the doors 12, 12, and to side columns 26A, 26D opposed to the side pillars 26B, 26C in the vehicle width direction and extended along the ceiling surface. For example, the handrails 22 are fixed to the side pillars 26B, 26C provided on either side of the doors 12, 12 and to the side columns 26A, 26D opposed to the side columns 26B, 26C in the vehicle width direction and extended along the ceiling surface.

On a cabin floor 20, a keep out area 28 is determined near the doors 12, 12. The keep out area 28 is, for example, a rectangular area which is color painted on the floor surface of the cabin. A dimension of the keep out area 28 in the vehicle width direction is determined to be, for example, in a range of 20 cm to 50 cm from the doors 12, 12. In addition, a dimension of the keep out area 28 in the vehicle longitudinal direction is determined to fall in a range, for example, from a front end of the side pillar 26B to a rear end of the side pillar 26C.

The keep out area 28 is provided in order to protect the occupant when the doors 12, 12 are opened/closed. For example, as described above, the keep out area 28 is defined in front of the doors 12, 12 in the cabin 14 to prevent the occupant from being caught by the doors when the open doors are closed by a closing operation or to prevent the occupant from being drawn into the door pocket or being drawn outside the vehicle when the closed doors are opened by an opening operation.

As described later, the door opening/closing determination device according to the present embodiment determines whether an alarm is issued depending on whether the occupant's gravity center position is within the keep out area 28. Therefore, there is a case where an alarm is not issued (a gravity center position is outside the keep out area 28) even if a body part of the occupant is within the keep out area 28, and there is also a case where an alarm is issued (a gravity center position is inside the keep out area 28) even if a body part of the occupant is not within the keep out area 28 at all. From the above viewpoint, the keep out area 28 has a role to show a rough guide for prohibiting the occupants from entering the keep out area.

Figure 9:
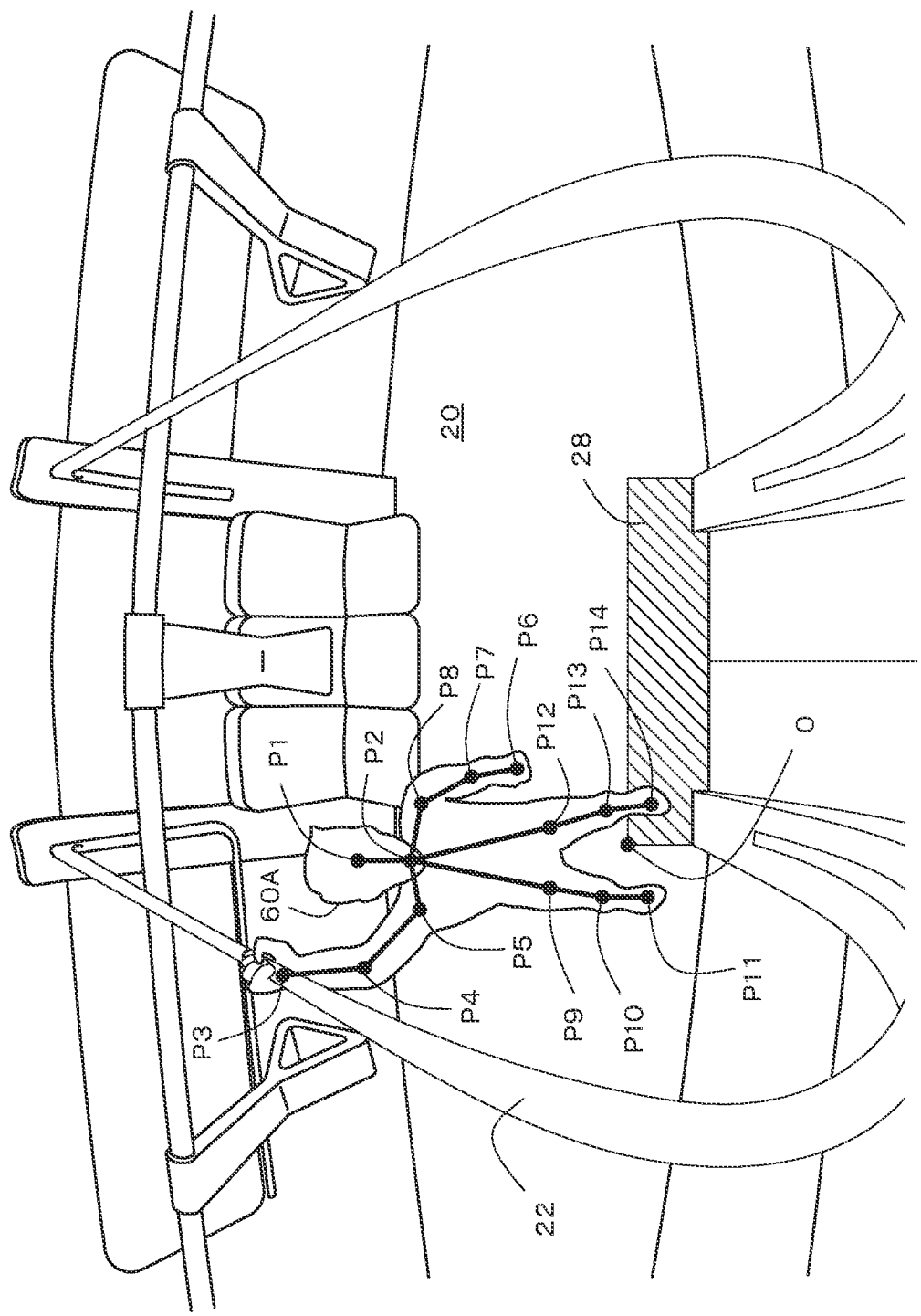
FIG. 9 is a view showing an example of a posture estimation process.

As shown in FIG. 9 described later, an original point O which is on an image plane in a captured image and used to determine a gravity center position of an occupant 60A is provided on the keep out area 28 provided on the cabin floor 20. The original point O is provided to be visually recognizable by the vehicle doorway camera 24. For example, the original point O is set at a corner, which is on the vehicle front side, of the keep out area 28.

<Imaging Equipment>

Referring to FIG. 3, the cabin 14 is provided with the vehicle doorway camera 24 as the imaging equipment. The vehicle doorway camera 24 is mounted above the vehicle doorway 16 which is provided with the doors 12, 12; namely, at a side end part of the ceiling wall in the vehicle width direction. For example, the vehicle doorway camera 24 is positioned so to make its optical axis perpendicular to the floor surface in the cabin and mounted so to face the keep out area 28.

The vehicle doorway camera 24 includes, for example, an imaging device such as CMOS or CCD and can capture an image as at least either of a still image and a moving image within the cabin 14. For example, the vehicle doorway camera 24 may be a dome type 360-degree camera (omnidirectional camera).

In addition, the vehicle doorway camera 24 may be a so-called RGB-D camera having an infrared measuring function capable of measuring in a depth direction. As described later, depth information of the vehicle doorway camera 24 is used to determine the occupant's height on the captured image. The determined height information is used for adjustment of the weight ratio when the gravity center position is calculated.

Figure 4:
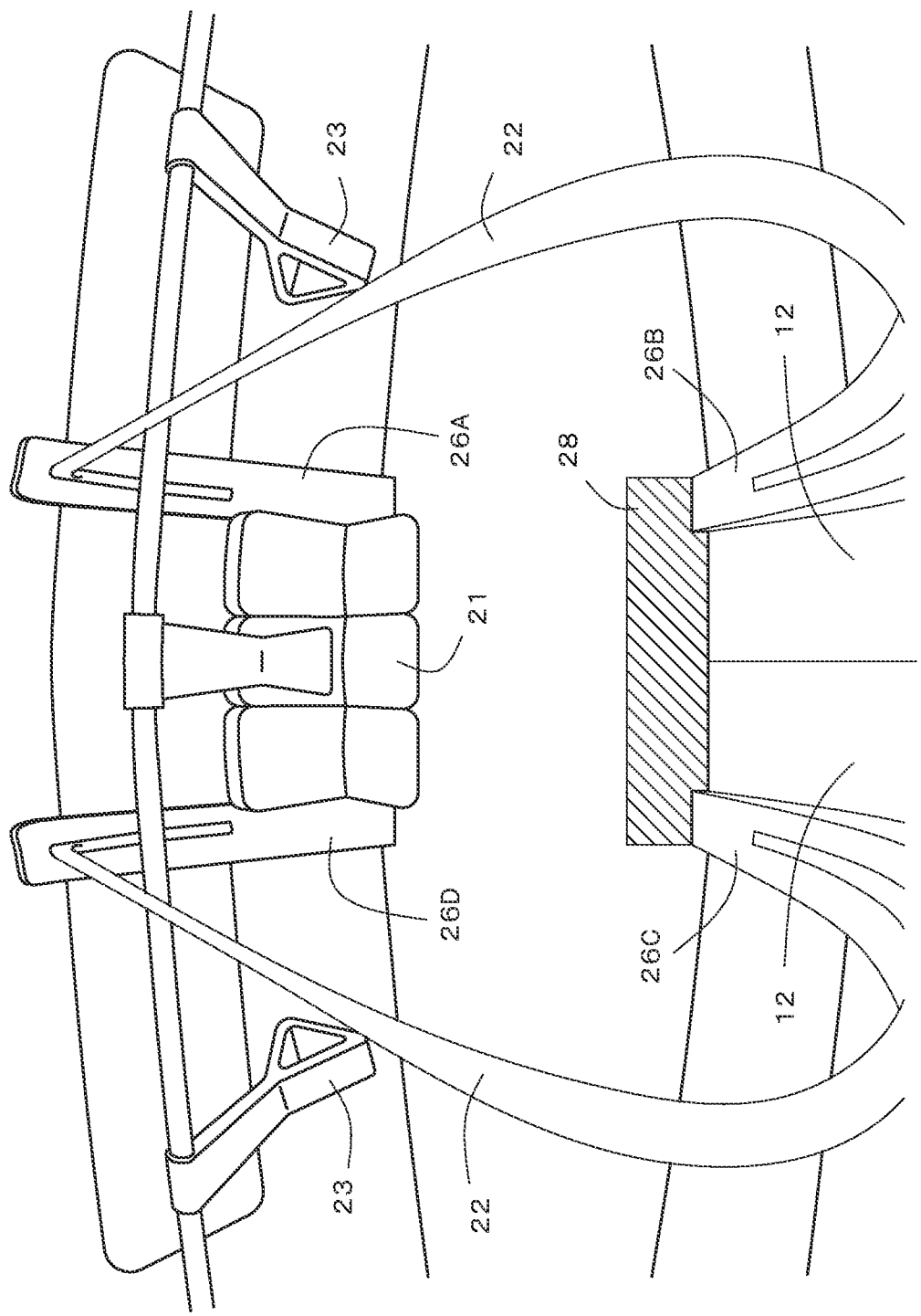
FIG. 4 is a view showing, for example, a captured image (without an occupant) photographed by a vehicle doorway camera.

The vehicle doorway camera 24 has an imaging range covering the doors 12, 12 of the vehicle 10 and the vicinity of the doors 12, 12 in the cabin 14. FIG. 4 shows, for example, a captured image taken by the vehicle doorway camera 24. As shown in the captured image, the keep out area 28 is wholly included in the view field of the vehicle doorway camera 24.

Figure 5:
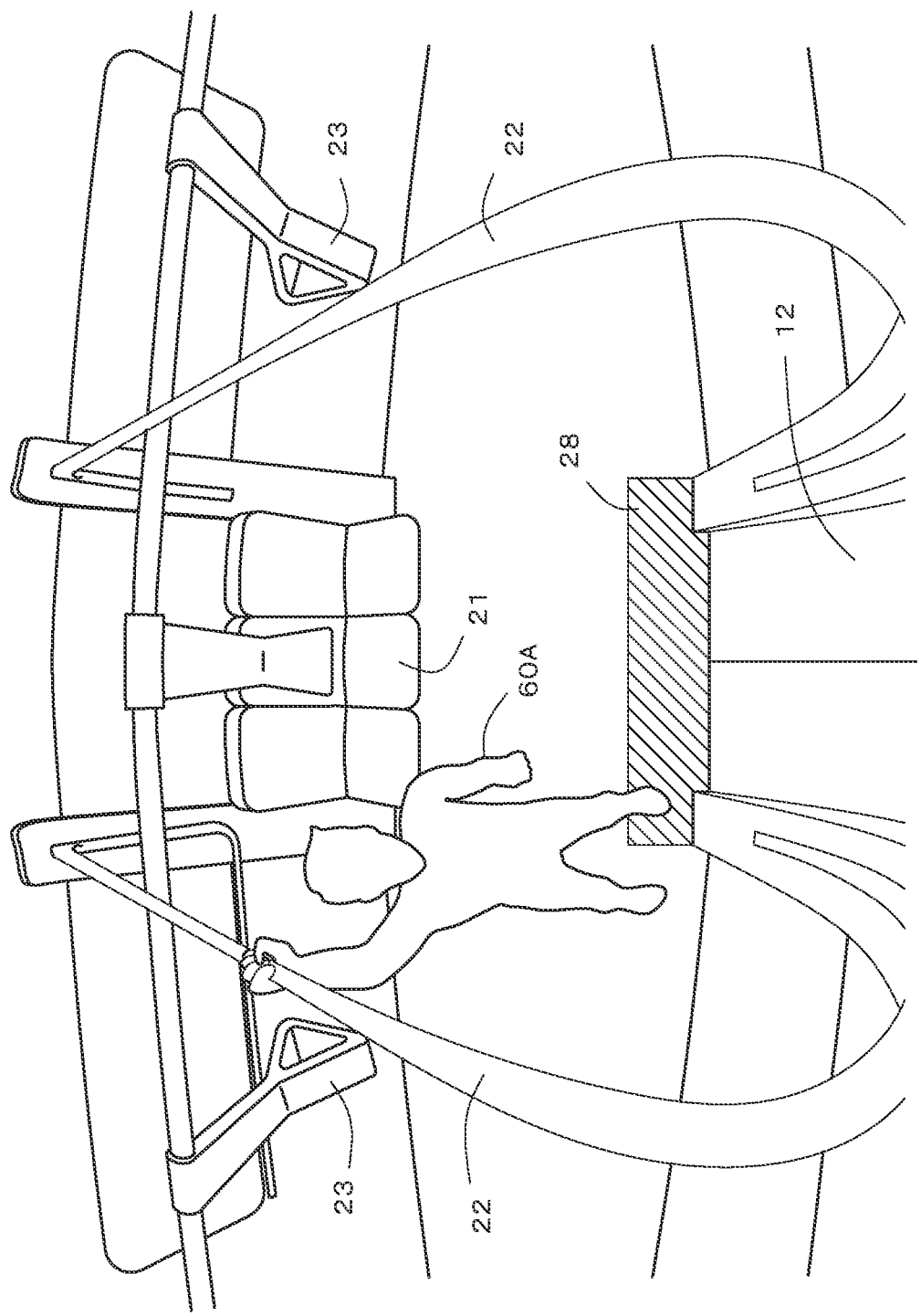
FIG. 5 is a view showing for example, a captured image (with an occupant) photographed by the vehicle doorway camera.

Referring to FIG. 3, the vehicle doorway camera 24 is positioned near the vehicle doorway 16, and the distance between the optical axis of the vehicle doorway camera 24 and the doors 12, 12 in the vehicle width direction is set closely, to be less than 15 cm for example. In this way, since the vehicle doorway camera 24 is placed near the doors 12, 12, it hardly occurs that the occupant stands between the vehicle doorway camera 24 and the doors 12, 12, or in other words, the occupant and the doors 12, 12 are arranged on the same side when viewed from the vehicle doorway camera 24. As shown in FIG. 5 for example, the captured image by the vehicle doorway camera 24 showing that the left foot of the occupant 60A is within the keep out area 28, but the captured image shows that the occupant 60A stands on the opposite side of the doors 12, 12 with the optical axis of the vehicle doorway camera 24 held between them.

Figure 6:
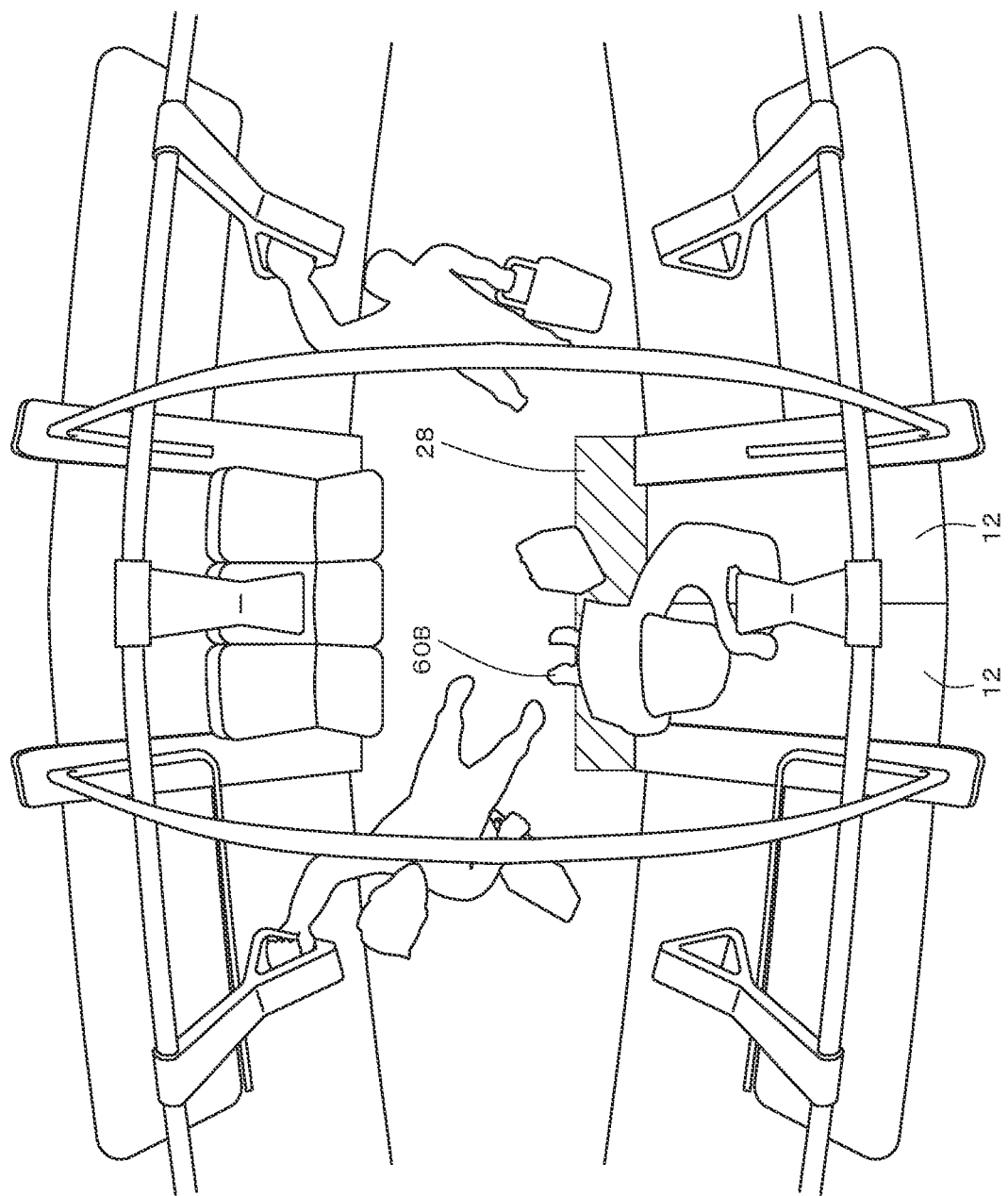
FIG. 6 is a view showing, for example, a captured image (with occupants) photographed by a ceiling center camera.

Meanwhile, FIG. 6 shows, for example, a captured image of a case that the imaging equipment is arranged at the center of the ceiling in the vehicle width direction instead of the vehicle doorway camera 24. In this captured image, an occupant 60B and the doors 12, 12 are arranged on the same side when viewed from the imaging equipment, and the greater part of the body of the occupant 60B overlaps the keep out area 28 and the doors 12, 12 in the image.

As described later, in a posture estimation flow according to the present embodiment, position estimation (three-dimensional space position estimation) of the occupant 60B in the cabin space is not performed, but the gravity center position of the occupant 60B is determined by exclusively using the coordinate point on a captured image plane. Therefore, as shown in FIG. 6, when the greater part of the occupant 60B overlaps the keep out area 28 in the image, there is a high possibility of decision that the gravity center position of the occupant 60B is included in the keep out area 28 even if the occupant 60B stands at a position away from the keep out area 28.

In this way, the imaging equipment of the door opening/closing determination device according to the present embodiment is used as the vehicle doorway camera 24 mounted at the vehicle doorway 16, so that it can be determined with high accuracy whether the occupant's gravity center position is included in the keep out area 28.

The vehicle doorway camera 24 may have a fixed view field and magnification. For example, the vehicle doorway camera 24 maintains the magnification and view field which are used when the keep out area 28 and its vicinity without an occupant are imaged as shown in FIG. 4, for example. Thus, since the view field and magnification of the vehicle doorway camera 24 are fixed, the positions of the original point O and the keep out area 28 on the captured image plane are fixed. Therefore, such positions can be grasped even if the original point O is not in the captured image or the keep out area 28 is partially hidden because of an occupant or a baggage for example.

<Analyzer>

Figure 7:
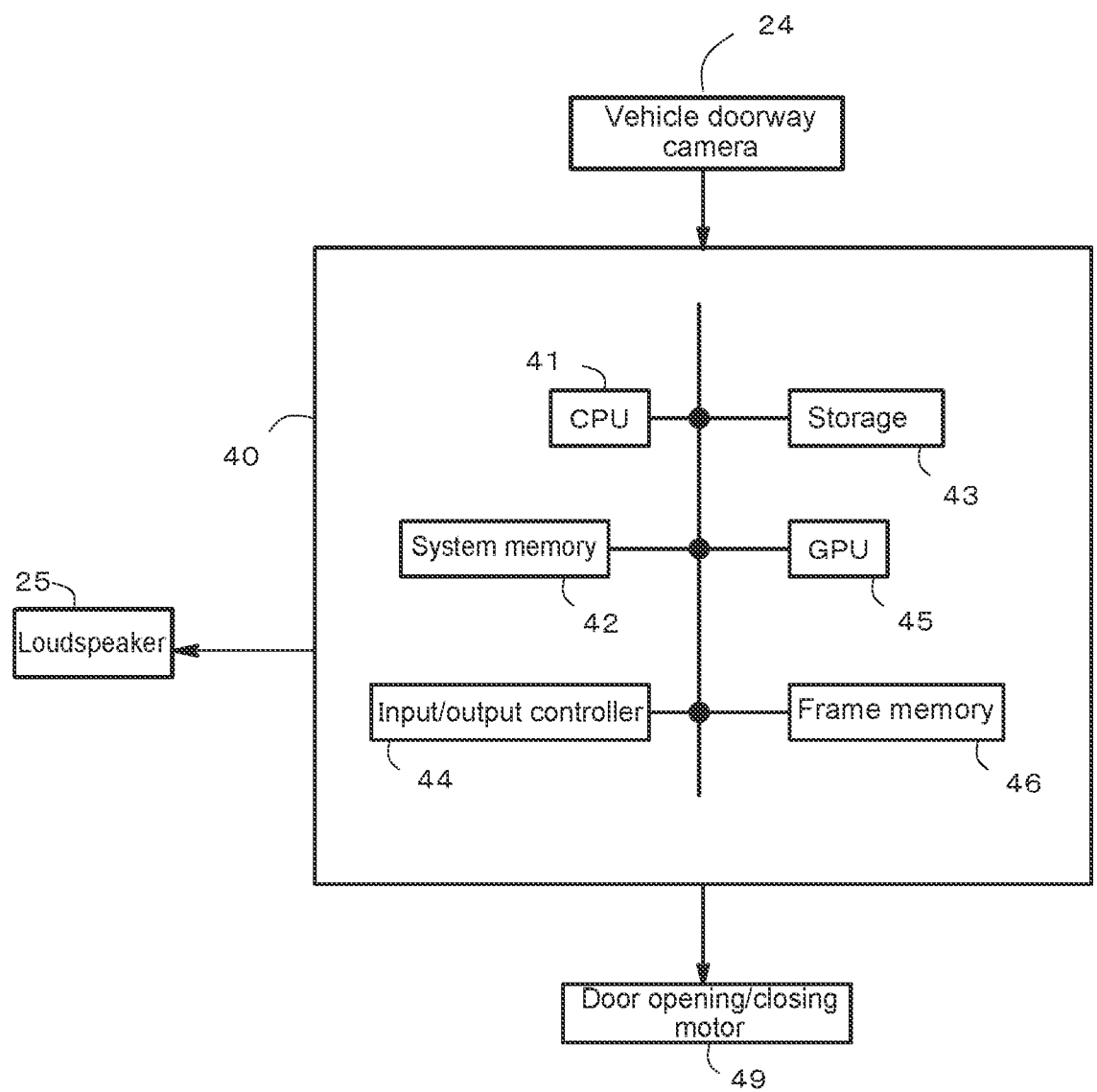
FIG. 7 is a view showing, for example, a hardware configuration of the door opening/closing determination device according to the present embodiment.

FIG. 7 shows an example of a hardware configuration of the door opening/closing determination device according to the present embodiment. This device includes the vehicle doorway camera 24 (the imaging equipment), the loudspeaker 25 (the alarm device), the vehicle interior monitoring ECU 40 (the analyzer), and the door opening/closing motor 49.

The vehicle interior monitoring ECU 40 serving as an analyzer analyzes a captured image taken by the vehicle doorway camera 24. For example, the vehicle interior monitoring ECU 40 is provided at a boundary part between the driver seat area and the occupant area in the cabin 14. The vehicle interior monitoring ECU 40 comprises a computer, for example. The vehicle interior monitoring ECU 40 is provided with a CPU 41 of an arithmetic unit, and a system memory 42 and a storage device 43 as a storage unit. The storage device 43 may be a non-fugitive storage device such as a hard disk drive (HDD) or a solid-state drive (SSD). The vehicle interior monitoring ECU 40 is provided with an input/output controller 44 for managing input/output of information with external equipment such as the vehicle doorway camera 24, the loudspeaker 25, and the door opening/closing motor 49.

As device for processing the captured image which is imaged by the vehicle doorway camera 24, the vehicle interior monitoring ECU 40 is also provided with a GPU 45 (Graphics Processing Unit) and a frame memory 46. The vehicle interior monitoring ECU 40 may also be provided with a display section for displaying the image processed by the GPU 45.

The GPU 45 is an arithmetic unit for image processing and is mainly operated to judge occupant leaning and baggage leaning described later. The frame memory 46 is a storage device for storing an image which is captured by the vehicle doorway camera 24 and undergoes arithmetic processing by the GPU 45.

Figure 8:
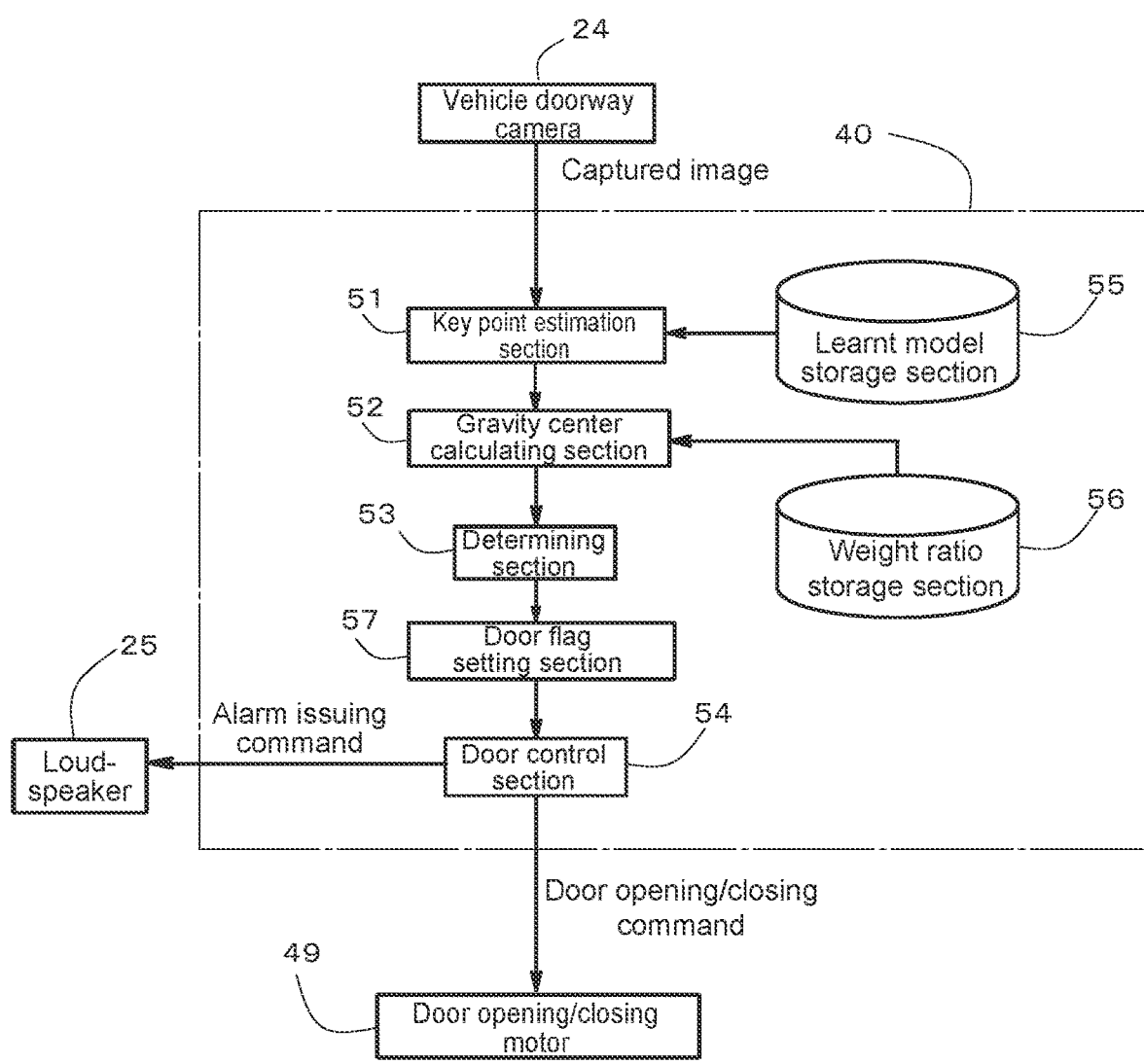
FIG. 8 is a view showing, for example, a function block of the door opening/closing determination device according to the present embodiment.

FIG. 8 shows, for example, a function block of the vehicle interior monitoring ECU 40. This function block diagram shows a configuration example in which the CPU 41 executes a program stored in the storage device 43 of the vehicle interior monitoring ECU 40 or stored in a non-fugitive storage medium such as a DVD readable by a computer.

The vehicle interior monitoring ECU 40 includes, as a processing function section, a key point estimation section 51 (posture estimation section), a gravity center calculating section 52, a determining section 53, a door control section 54, and a door flag setting section 57. The vehicle interior monitoring ECU 40 also includes, as a storage section, a learnt model storage section 55 and a weight ratio storage section 56. The learnt model storage section 55 stores teacher data which is used by the key point estimation section 51 to perform posture estimation. The weight ratio storage section 56 stores the weight ratio which is used by the gravity center calculating section 52 to calculate a gravity center.

The key point estimation section 51 (posture estimation section) recognizes an occupant (person) from a captured image taken by the vehicle doorway camera 24 and estimates a posture of the occupant. Relative positions of the occupant's parts such as arms and legs are estimated by the posture estimation. Since the posture estimation is a known technology, its explanation is made briefly below.

For example, as a part of the key point estimation section 51, OpenPose that is software for posture estimation proposed by Zhe Cao et al. is used. For example, this software is used to estimate positions of "key points" indicating parts such as a head and a neck in the captured image. For example, as shown in FIG. 9, a total of 14 key points corresponding to respective parts of the occupant 60A in the captured image are estimated. The key points are a head part P1, a neck part P2, a right hand P3, a right elbow P4, a right shoulder P5, a left hand P6, a left elbow P7, a left shoulder P8, a right hip P9, a right knee P10, a right ankle P11, a left hip P12, a left knee P13, and a left ankle P14.

To estimate the respective key points, the learnt model storage section 55 is mounted with a neural network for image recognition for each key point. For example, this neural network is configured of a convolutional neural network (CNN).

In addition, an algorithm for connecting the respective estimated key points is stored in the learnt model storage section 55.

Figure 10:
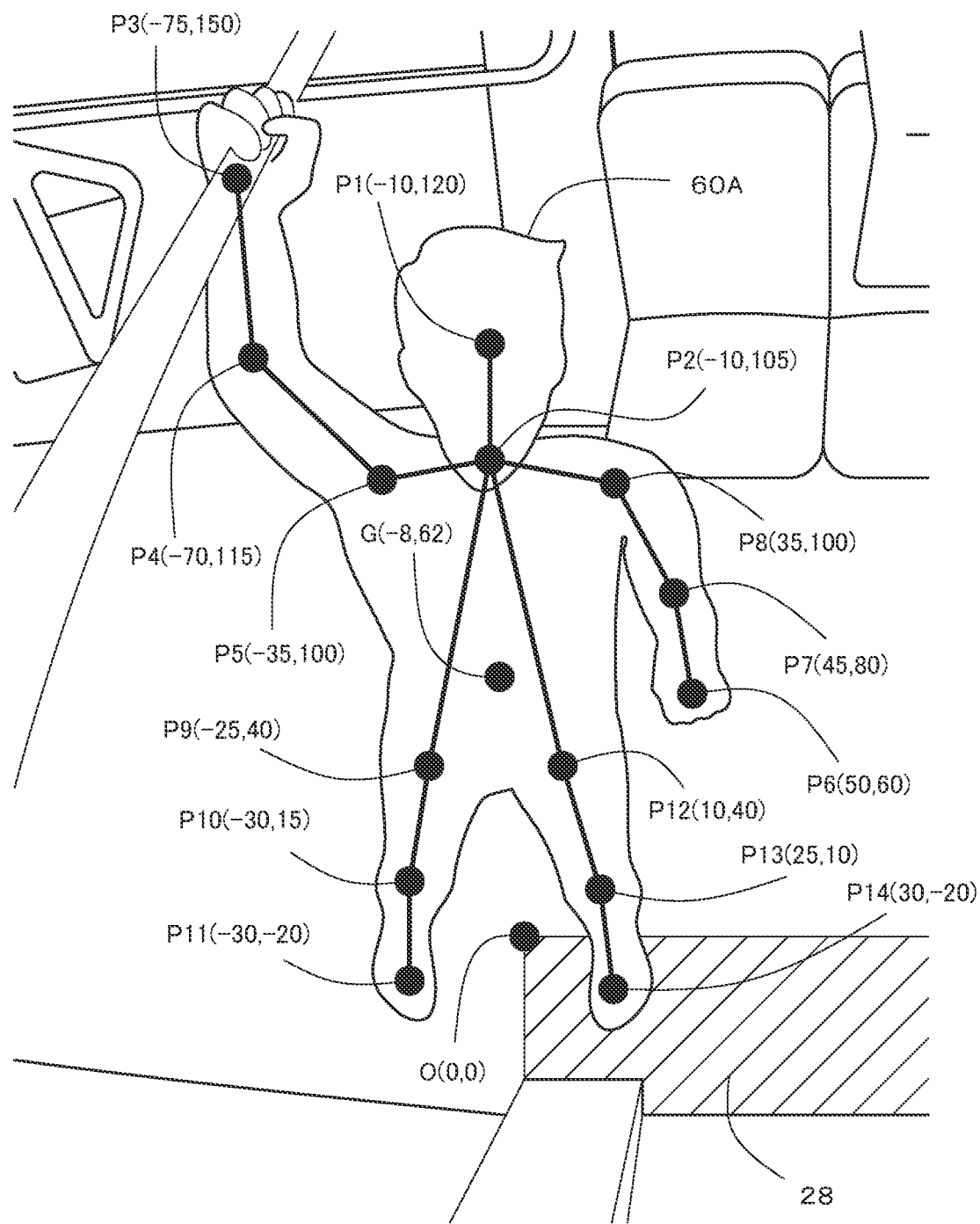
FIG. 10 is a view showing, for example, a gravity center calculation process.

From the vehicle doorway camera 24, the key point estimation section 51 (posture estimation section) obtains a vehicle interior image near the doors 12, 12 and recognizes the respective key points P1 to P14 of the occupant 60A from the learnt model storage section 55 as shown in FIG. 9, for example. Further, the key point estimation section 51 connects the key points by straight lines. As shown in FIG. 10 for example, coordinate point information indicating a distance from the original point to each of the key points P1 to P14 on the image plane is sent from the key point estimation section 51 to the gravity center calculating section 52.

The gravity center calculating section 52 determines the occupant's gravity center position which is included in the captured image and has the key points estimated. The gravity center to be determined by the gravity center calculating section 52 according to the present embodiment is different from a so-called center of mass, and a posture center on the captured image is determined.

The gravity center calculating section 52 determines the coordinates of a gravity center G from the weight ratios of the respective key points stored in the weight ratio storage section 56 and the coordinates of the respective key points of the occupant 60A shown as an example in FIG. 10. A weight ratio wi (i=1 to 14) is determined for each key point Pi (each body part).

For example, a weight ratio w1=0.15 is determined for the key point P1 of a head part. A weight ratio w2=0.05 is determined for the key point P2 of a neck. Weight ratios w3=0.01, w6=0.01 are determined for the key points P3, P6 of the hands. Weight ratios w4=0.05, w7=0.05 are determined for the key points P4, P7 of the elbows. Weight ratios w5=0.03, w8=0.03 are determined for the key points P5, P8 of the shoulders. Weight ratios w9=0.25, w12=0.25 are determined for the key points P9, P12 of the hips. Weight ratios w10=405, w13=0.05 are determined for the key points P10, P13 of the knees. Weight ratios w11=0.01, w14=0.01 are determined for the key points P11, P14 of the toes. It is determined that the total sum of these weight ratios P1 to P14 becomes 1.0.

Referring to FIG. 10, specifically, when a horizontal axis is set as an x axis and a vertical axis is set as a y axis on a coordinate plane, coordinates (xg, yg) of the gravity center G are determined based on the following numerical expression (1).

[MATH. 1]

$$G(x_g, y_g) = \Sigma P_i(x_i, y_i) \times W_i \qquad (1)$$

For example, using mathematical expression (1) in the example of FIG. 10, the gravity center calculating section 52 determines gravity center positional coordinates G (−8, 62)

of the occupant 60A. The determined gravity center position is sent to the determining section 53.

<Door Opening/Closing Determination Flow>

Figure 11:
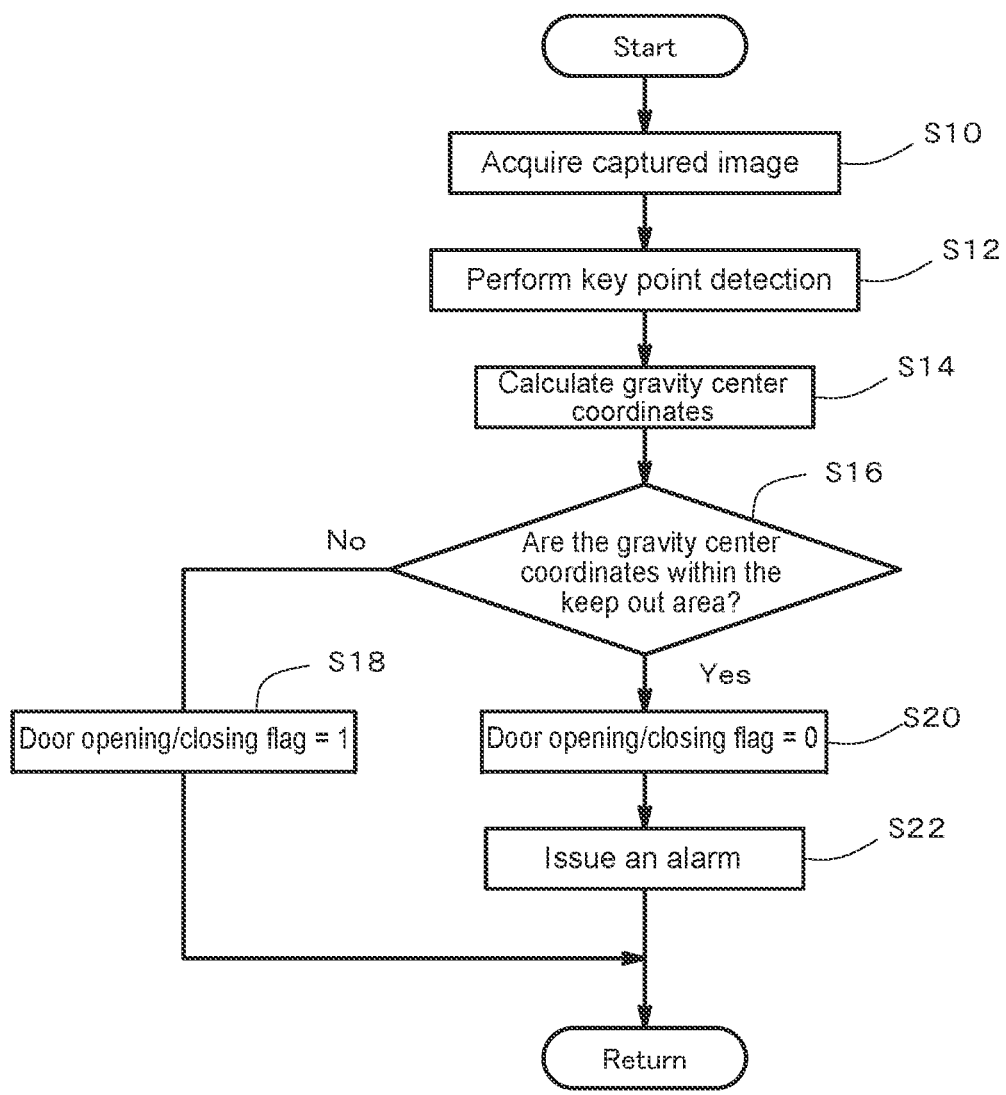
FIG. 11 is a flowchart showing, for example, a door opening/closing determination flow according to the present embodiment.

FIG. 11 shows, for example, a door opening/closing determination flow to be performed by the door opening/closing determination device according to the present embodiment. For example, this flow is preformed repeatedly from a time of arrival of the vehicle 10 at a stop to a time of departure. Among the respective steps exemplified in FIG. 11, the steps other than step S22 are performed by the vehicle interior monitoring ECU 40 as the analyzer, so that the steps S10 to S20 may be called an "analysis step" collectively.

When the vehicle is operating, for example, the vehicle doorway camera 24 always captures the images inside the cabin 14 (imaging step). A captured image is sent to the key point estimation section 51 (posture estimation section) (S10). As described above, the key point estimation section 51 performs the key point estimation within the acquired captured image (posture estimation step S12). Coordinates (image plane coordinates) of the respective estimated key points P1 to P14 are sent to the gravity center calculating section 52.

The gravity center calculating section 52 performs the above-described calculation on the gravity center position (gravity center calculation step S14). The calculated gravity center coordinates are sent to the determining section 53. The determining section 53 determines whether the gravity center coordinates are included in the keep out area 28 (determination step S16). For example, the determining section 53 stores position information on the keep out area 28 which is given on the captured image plane. According to the position information, the determining section 53 determines whether the gravity center coordinates are included in the keep out area 28.

When it is determined by the determining section 53 that the gravity center coordinates are included in the keep out area 28, the door flag setting section 57 sets a door opening/closing flag to 0 (S20). The door opening/closing flag is a value for determining whether the door opening/closing motor 49 can be driven, and when the door opening/closing flag is set to 0, the door control section 54 places the door opening/closing motor 49 into a stopped state. In other words, when the vehicle doorway 16 is closed, the closed state is maintained, and when the vehicle doorway 16 is in an opened state, the opened state is maintained.

Upon receiving the set value 0 of the door opening/closing flag, the door control section 54 sends an alarm issuing command to the loudspeaker 25 used as the alarm device. According to the received command, the loudspeaker 25 issues an alarm inside the cabin 14 (warning step S22). For example, the loudspeaker 25 reproduces an announcing voice indicating that a distance should be taken from the keep out area, and the flow returns to the start point.

Meanwhile, when the determining section 53 determines in step S16 that gravity center positional coordinates are not included in the keep out area 28, the door flag setting section 57 sets the door opening/closing flag to 1 (S18). When the set value 1 of the door opening/closing flag is received, the door control section 54 is enabled to drive the door opening/closing motor 49.

For example, in a state that the door opening/closing flag is set to 1, when a signal indicating that the vehicle 10 has stopped at a stop is received from an operation control ECU (not shown) of the vehicle 10 or from a remote control center, the door control section 54 outputs an opening command to the door opening/closing motor 49 to open the closed doors 12, 12. In a state that the door opening/closing flag is set to 1, when a signal indicating that the vehicle 10 starts from the stop is received from the operation control ECU (not shown) of the vehicle 10 or from the remote control center, the door control section 54 outputs a closing command to the door opening/closing motor 49 to close the doors 12, 12 which are in the opened state.

In this way, the door opening/closing determination device according to the present embodiment determines whether the doors 12, 12 can be opened/closed based on a positional relation between the occupant's gravity center position and the keep out area 28 instead of determining whether the occupant has simply entered the keep out area 28.

<Weight Ratio Adjustment>

In the above-described embodiment, the weight ratio of each key point is a fixed value. However, the door opening/closing determination device and method according to the present embodiment are not limited to the above embodiment.

For example, the weight ratio may be changed according to the occupant's height in the captured image. In general, the weight ratio of the head part becomes relatively high when the height is low, and the center of gravity becomes high. For example, the center of gravity of the child is higher than that of an adult. Therefore, the gravity center calculating section 52 may adjust each weight ratio to increase the weight ratio of the head part when the occupant's height is low.

As described above, when the vehicle doorway camera 24 is a GRB-D camera which is also capable of acquiring depth information, the occupant's height becomes obtainable. In other words, the optical axis of the vehicle doorway camera 24 is perpendicular to the cabin floor 20, so that the depth information acquired by the vehicle doorway camera 24 can be used as height information. For example, a height value from the cabin floor 20 can be obtained by subtracting a depth value D from a mounting height H of the vehicle doorway camera 24 from the cabin floor 20.

For example, the key point P1 of the head part of the occupant 60A (FIG. 9) is estimated by the key point estimation section 51 (posture estimation section). A height value of the pixel corresponding to this key point P1 becomes a height of the occupant 60A.

This height information is transmitted to the gravity center calculating section 52. The gravity center calculating section 52 changes each weight ratio based on the acquired height information. For example, the gravity center calculating section 52 increases the weight ratio of the head part while keeping the total sum 1.0. By adjusting the weight ratio to the height, it becomes possible to determine the gravity center of the occupant more accurately.

The present disclosure is not limited to the present embodiments described above, and includes all changes and modifications without departing from the technical scope or the essence of the present disclosure defined by the claims.

The invention claimed is:

1. A door opening/closing determination device, comprising:
    imaging equipment having an imaging range which includes doors of a vehicle and a vicinity of the doors in a vehicle cabin, and
    an electronic control unit configured to:
        analyze a captured image taken by the imaging equipment,
        calculate a gravity center position of an occupant included in the captured image, determine whether the gravity center position is included in a keep out area provided in the vicinity of the doors,
perform posture estimation to estimate a relative position of each body part of the occupant included in the captured image,
determine the gravity center position on an image plane on the basis of a total sum of values which are obtained by multiplying a distance ranging from an original point to each of the respective parts on the image plane of the captured image by a weight ratio for each of the parts,
acquire the occupant's height information included in the captured image, and
increase the weight ratio of the occupant's head part when the occupant's height is low; and
an alarm device provided to issue an alarm in the cabin when it is determined that the gravity center position is included in the keep out area.

2. The door opening/closing determination device according to claim 1, wherein:
the original point is visually provided on a floor surface of the cabin, and
a visual field and magnification of the imaging equipment are fixed.

3. The door opening/closing determination device according to claim 1, wherein:
the imaging equipment is mounted above a vehicle doorway where the doors are provided.

4. A door opening/closing determination method comprising:
imaging vehicle doors and a vicinity of the doors in a cabin by imaging equipment, and
analyzing a captured image taken by the imaging equipment, wherein:
the analysis step includes:
calculating an occupant's gravity center position included in the captured image,
determining whether the gravity center position is included in a keep out area provided in the vicinity of the doors,
performing posture estimation to estimate a relative position of each body part of the occupant included in the captured image,
determining the gravity center position on the image plane on the basis of a total sum of values which are obtained by multiplying a distance ranging from an original point to each of the respective parts on the image plane of the captured image by a weight ratio for each of the parts,
acquiring the occupant's height information included in the captured image, and
increasing the weight ratio of the occupant's head part when the occupant's height is low; and
issuing an alarm in the cabin when it is determined that the gravity center position is included in the keep out area.

5. The door opening/closing determination method according to claim 4, wherein:
the original point is visually provided on a floor surface of the cabin, and
a view field and magnification of the imaging equipment are fixed.

6. The door opening/closing determination method according to claim 4, wherein:
the imaging equipment is provided above a vehicle doorway where the doors are provided.

* * * * *